United States Patent
Lagares-Gamero

(10) Patent No.: US 10,362,791 B2
(45) Date of Patent: Jul. 30, 2019

(54) AIR DRYING PLANT AND METHOD FOR AIR DRYING CUT-UP FOOD

(71) Applicant: Metalquimia SA, Girona (ES)

(72) Inventor: Josep Lagares-Gamero, Girona (ES)

(*) Notice: Subject to any disclaimer, the term of this patent is extended or adjusted under 35 U.S.C. 154(b) by 192 days.

(21) Appl. No.: 15/497,753

(22) Filed: Apr. 26, 2017

(65) Prior Publication Data

US 2017/0303553 A1   Oct. 26, 2017

(51) Int. Cl.
| | | |
|---|---|---|
| *A23B 9/08* | (2006.01) | |
| *A23L 3/00* | (2006.01) | |
| *A23L 3/40* | (2006.01) | |
| *F26B 3/04* | (2006.01) | |
| *F26B 15/06* | (2006.01) | |
| *F26B 21/00* | (2006.01) | |
| *A23N 12/08* | (2006.01) | |
| *A23B 4/03* | (2006.01) | |
| *A23B 7/02* | (2006.01) | |
| *A23L 3/18* | (2006.01) | |

(52) U.S. Cl.
CPC .............. *A23B 9/08* (2013.01); *A23B 4/031* (2013.01); *A23B 7/02* (2013.01); *A23L 3/001* (2013.01); *A23L 3/40* (2013.01); *A23N 12/08* (2013.01); *F26B 3/04* (2013.01); *F26B 15/06* (2013.01); *F26B 21/004* (2013.01); *A23L 3/18* (2013.01); *A23V 2002/00* (2013.01)

(58) Field of Classification Search
CPC .......... F26B 3/04; F26B 15/06; F26B 21/004; A23B 9/00; A23B 4/031; A23B 7/02; A23L 9/00; A23L 3/40; A23L 3/18; A23N 12/08; A23V 2002/00
USPC ........................................................ 34/376
See application file for complete search history.

(56) References Cited

U.S. PATENT DOCUMENTS

| | | | | |
|---|---|---|---|---|
| 6,268,012 B1* | 7/2001 | Sikora | ................. | A23B 7/0205 426/465 |
| 7,730,633 B2* | 6/2010 | Jurkovich | .............. | A23K 40/00 34/381 |
| 9,456,623 B2* | 10/2016 | Silbermann | .............. | A23B 9/08 |
| 9,733,015 B2* | 8/2017 | Onose | ..................... | F26B 21/10 |

(Continued)

FOREIGN PATENT DOCUMENTS

| | | | | |
|---|---|---|---|---|
| EP | 2520172 B1 * | 4/2015 | ............. | A22C 11/00 |
| EP | 3238547 A1 * | 11/2017 | ............... | A23B 9/08 |
| EP | 3238547 B1 * | 9/2018 | ............... | A23B 9/08 |

*Primary Examiner* — Stephen M Gravini
(74) *Attorney, Agent, or Firm* — Eugenio J. Torres-Oyola; Victor M. Rodriguez-Reyes; Rafael Rodriguez-Muriel

(57) ABSTRACT

The present invention relates to an air-drying plant for air drying cut-up food. The proposed plant consists of a conveyor (10) for cut-up food (1) defining a conveying surface (11), a plurality of blowing conduits (20) with blowing openings (21) channeling a treated airflow at a speed of treatment with a controlled temperature comprised between 4° C. and 60° C. and a controlled humidity; wherein the conveyor includes air treatment segments (12) with conveying surfaces (11) facing and adjacent to said blowing openings (21), said treated airflow being channeled against said conveying surface (11) in an upward or downward direction; and wherein the conveyor (10) also includes idle segments (13) intercalated between said air treatment segments (12), the conveying surface (11) of which is not facing the blowing openings (21), nor is it subjected to an airflow.

16 Claims, 4 Drawing Sheets

(56) References Cited

U.S. PATENT DOCUMENTS

| | | | | |
|---|---|---|---|---|
| 10,047,384 B2* | 8/2018 | Medoff | ............. | A61Q 19/00 |
| 10,064,416 B2* | 9/2018 | Lagares Corominas | ............. | |
| | | | | A23B 4/031 |
| 10,143,986 B2* | 12/2018 | Ryu | ............. | B01J 8/1818 |
| 2002/0040643 A1* | 4/2002 | Ware | ............. | A23B 7/0205 |
| | | | | 99/467 |
| 2015/0037478 A1* | 2/2015 | Asahina | ............. | F26B 3/082 |
| | | | | 426/451 |
| 2015/0150268 A1* | 6/2015 | Barnett | ............. | A21D 8/02 |
| | | | | 426/560 |
| 2017/0303553 A1* | 10/2017 | Lagares-Gamero | ..... | A23B 9/08 |
| 2018/0064122 A1* | 3/2018 | Ota | ............. | A23L 3/185 |

* cited by examiner

AIR DRYING PLANT AND METHOD FOR AIR DRYING CUT-UP FOOD

FIELD OF THE ART

The present invention relates to a plant and a method for air drying cut-up food, of the type in which the cut-up food is spread on a conveyor which carries the cut-up food and exposes it to a treated airflow having specific and advantageously controlled temperature and/or humidity, causing accelerated dehydration of the cut-up food for curing or drying.

STATE OF THE ART

Treatment for drying food by means of treated airflow is widely known, for example, by means of patent documents WO03073871A1 and EP2213178A1, describing food curing by means of a treated airflow, however these background documents do not describe the use of blowing conduits facing a conveyor, producing an airflow approximately perpendicular to said conveyor.

It is also known, by means of patent documents U.S. Pat. Nos. 4,726,766 and 4,544,352, for example, the use of treatment plants provided with a spiral conveyor provided with superimposed segments, with a plurality of blowing conduits intercalated between said superimposed segments of the conveyor, which thereby allows applying a treated airflow on each of said superimposed segments and on the food deposited thereon.

However, these last two known patent documents describe ovens for baking foods, and not for drying. In these patent documents, the blowing conduits only cover some segments of the conveyor, therefore leaving other segments of the conveyor without any treated airflow, but the entire conveyor being contained in a casing enclosing a volume of air therein which is heated to baking temperatures, so all the air contained in said casing will have said baking temperature and an identical relative humidity, therefore producing homogeneous baking both in the segments subjected to airflow and in the segments without said treated airflow. Said patent documents therefore do not describe food treatment with a treated airflow and segments not successively treated with air, given that in segments without airflow, the surrounding air will be at the baking temperature and will therefore also cause food to bake in said segments.

In pieces of food having a certain thickness, drying by means of a treated airflow has the problem of causing dehydration of the outermost layer of the treated pieces of food greater than the dehydration of their innermost layer. This problem is described in patent documents U.S. Pat. Nos. 4,890,394 and 2,408,434, although not applied to foods but rather to construction elements such as wood and gypsum, but said patent documents propose solving said problem by means of drying the outer layer using a treated airflow and drying the inner layer by means of microwave or other forms of radiofrequency.

BRIEF DESCRIPTION OF THE INVENTION

According to a first aspect of the present invention, the present invention relates to a drying plant for drying cut-up food by air.

Said drying plant causes drying by dehydration of the cut-up food by means of the application of a treated airflow on said cut-up food. It will be understood that cut-up food refers to pieces of edible products. Said pieces of edible products will preferably have a thickness greater than 0.5 mm and less than 30 or 40 mm, regardless of whether they consist of a single piece of food or a mass, puree, mash or food agglomerate.

The proposed plant thus includes:
- a conveyor for cut-up food defining a conveying surface and a direction of conveyance;
- a plurality of blowing conduits including blowing openings channeling a treated airflow at a speed of treatment with a controlled temperature comprised between 4° C. and 60° C. and a controlled humidity.

The mentioned conveyor consists of an automatically operated mechanism moving the cut-up food deposited on a conveying surface in a specific direction herein referred to as direction of conveyance. Examples of said conveyors can be, by way of non-limiting example, a conveyor belt, a grid mat conveyor, a tray conveyor (the trays being the conveying surface), a vibrating table, a guided carriage, etc. Said conveyor will be operated, also by way of example, through the action of an electric or hydraulic motor controlled by means of a programmable control unit that could receive signals from different sensors, such as for example, temperature and humidity sensors.

The treated air will be the air the temperature and/or humidity of which has been modified by means of air treatment devices, such as heating machines, coolers, heat exchangers, dehumidifiers, etc, and it is envisaged that said treated air is driven through said blowing conduits by means of air driving devices, for example, pumps or fans, conferring said speed of treatment thereto.

The proposed plant further includes, in a novel manner, the following features:
- the conveyor includes air treatment segments the conveying surfaces of which are facing and adjacent to said blowing openings of at least one of said plurality of blowing conduits, said treated airflow being channeled against said conveying surface of the air treatment segments in a upward or downward direction;
- the conveyor also includes idle segments intercalated between said air treatment segments, the conveying surface of which is not facing the blowing openings, nor is it subjected to an airflow, and comprising a plurality of idle segments intercalated between air treatment segments along the direction of conveyance.

It will be understood that the air treatment segments and the idle segments are intercalated in the direction of conveyance, allowing the conveyor to transfer cut-up foods from an air treatment segment to an idle segment and again to an air treatment segment, and so on until reaching the outlet at the end of the conveyor at the outlet of the drying plant.

The treated airflow being projected against the conveying surface in an upward or downward direction from blowing openings adjacent to and facing said conveying surface, all the cut-up food arranged on said conveying surface will receive a direct supply of treated air, without the treated air received by a piece of cut-up food having previously passed through other pieces of cut-up food, which would change the speed, humidity and temperature of the treated air, therefore the drying of all the pieces of cut-up food will be uniform.

According to an optional embodiment, the treated air will have a relative humidity less than 35%, or preferably comprised between 5% and 25%, and/or a temperature between 30° and 50°. Furthermore, it is contemplated that the aforementioned speed of treatment will be greater than 1 m/s, or preferably greater than 1.5 m/s.

It is also contemplated that the air surrounding the idle segments has a relative humidity greater than the relative humidity of the treated air, given that the surrounding air will be at least in part air previously expelled through the blowing openings which would have absorbed moisture from the cut-up food. It is also considered that the surrounding air will have a temperature lower than the temperature of the treated air, the temperature of the treated air being higher than the temperature of the cut-up food fed to the drying plant, or a temperature higher than the temperature of the treated air, the temperature of the treated air being lower than the temperature of the cut-up food in the drying plant. This means that the temperature of the treated air, after contacting with the cut-up food, will be modified as a result of the difference in temperature existing between said treated air and said cut-up food, and as a result of the evaporation process, causing a reduction in temperature both of the cut-up food and of the air. As a result of this process, the air surrounding the idle segments, which will be at least in part air previously expelled through the blowing openings, will have a temperature different from the temperature of the treated air.

In a preferred embodiment of the proposed invention, the conveyor is a conveyor with superimposed levels or a spiral conveyor with superimposed levels, said conveyor may or may not being perforated. In other words, the conveyor can consist of different levels arranged one on top of the other and independent from one another, for example parallel levels each independently fed with cut-up food, or one and the same conveyor the length of which has been wound in a spiral shape with superimposed levels, such that the cut-up food fed to said conveyor goes through all the levels thereof while being conveyed in the direction of conveyance.

There are many conveyors of this type on the market and they are widely used in the industry and well known by the persons skilled in the art; these conveyors consist of, for example, sliding mats or meshes pulled by chains or driven from the sides thereof, or conveyor belts, tables with rollers on which trays can slide, etc.

It is also proposed that said plurality of blowing conduits are intercalated between said superimposed levels of the conveyor or of the spiral conveyor, such that levels of conveyor will have levels of blowing conduits which will be intercalated between said levels of conveyor.

According to a preferred embodiment, said conveyor includes straight segments of the conveyor arranged in superimposed levels, and wherein said blowing conduits include straight blowing conduits superimposed said straight segments of the conveyor, said straight segments of the conveyor forming the air treatment segments. This embodiment reduces the costs for manufacturing the proposed plant, given that the air treatment segments, the conveying surface of which is facing said blowing openings, are straight allowing the blowing conduits to also be straight and therefore more economical.

Additionally, it is proposed that said conveyor includes superimposed curved conveyor segments lacking blowing conduits provided with blowing openings intercalated between said superimposed curved conveyor segments, said curved conveyor segments forming the idle segments. The curved areas of the conveyor are reserved for positioning the idle areas therein, thus preventing the placement of blowing conduits, with their corresponding blowing openings, in said curved segments, which would make the plant more expensive.

It is optionally contemplated that the air treatment segments and the idle segments are located in different enclosures at least partially demarcated by air impermeable partitioning elements to allow the air surrounding both segments to have different temperature and/or humidity characteristics.

With respect to the blowing conduits, it is proposed that the face provided with blowing openings of at least one blowing conduit is parallel to the conveying surface of the segment of the conveyor facing said surface, said blowing conduit being elongated in a direction parallel to the direction of conveyance of the conveyor segment facing said conduit. Therefore, according to said configuration at least one of the blowing conduits is a conduit running in the direction of conveyance and with a face parallel to the conveying surface, which thereby allows arranging blowing openings homogeneously distributed on the conveying surface for a long segment thereof, which preferably corresponds with an air treatment segment.

At least one segment of the blowing conduit preferably has a constant width and a variable section decreasing in the direction of air circulation through the inside thereof. The constant width of the blowing conduit allows having a face with a constant surface on which the blowing openings are positioned, and the decreasing variable section, which is attained by reducing the height of the conduit, allows maintaining a constant air flow rate in the entire length thereof despite the exit of air through the blowing openings, and the head loss of the conveyed air. All the blowing openings thereby provide an equal airflow.

Likewise it is proposed that, according to a preferred embodiment, each of said air treatment segments and/or each of said idle segments has a length, in the direction of conveyance, of at least five meters, thereby achieving a sufficient treatment time of the conveyed cut-up food so as to cause the correct drying thereof, considering a speed of conveyance which can be regulated within the common range of operation for such conveyors in the industry.

Furthermore or alternatively, it is proposed that the length of at least one idle segment is comprised between 40% and 60% of the length of the preceding air treatment segments, in the direction of conveyance.

It is also proposed that suction conduits are arranged adjacent to the air treatment segments, the air absorbed by said suction conduits being used for obtaining said treated air. Said suction conduits will therefore be communicated with said air treatment devices which produce and provide the treated air, allowing the recirculation of all or part of the suctioned air in order to reuse it as treated air, and/or to recover thermal energy from said suctioned air for modifying the temperature of the treated air by means of a heat exchanger.

According to another embodiment at least part of said suction conduits are located in the limits between the air treatment segments and the idle segments.

According to a second aspect of the invention, the invention relates to an air drying method for air drying cut-up food, said method being applied by means of a plant including:
  a conveyor for cut-up food defining a conveying surface and a direction of conveyance;
  a plurality of blowing conduits including blowing openings channeling a treated airflow at a speed of treatment with a controlled temperature comprised between 4° C. and 60° C. and a controlled humidity;
and the method comprising the following steps:
a) feeding cut-up food to said conveying surface of the conveyor;

b) conveying, by means of the operation of the mentioned conveyor, said cut-up food to an air treatment segment facing said blowing openings, said cut-up food being arranged facing said blowing openings of said blowing conduits;

c) subjecting said cut-up food to a drying treatment by means of a flow of said treated air for a drying time, causing moisture reduction in the outermost layer of said cut-up food;

d) conveying, by means of the operation of the mentioned conveyor, said cut-up food to an idle conveyor segment, said cut-up food being exposed to a surrounding air consisting at least in part of untreated ambient air and lacking an airflow, causing rehydration of the outermost layer of the cut-up food with the internal moisture of the cut-up food, tending to achieve a homogeneous moisture in the cut-up food as a whole;

e) repeating steps b), c) and d) cyclically, along a succession of air treatment segments and idle segments that are intercalated, until achieving specific drying of the cut-up food.

The cut-up food is therefore exposed, along the air treatment segments of the conveyor, to a treated airflow coming from blowing openings facing the conveying surface of the conveyor, causing dehydration of the outermost layer outer of the cut-up food. Said cut-up food is then conveyed to the idle segments, where said cut-up food is not exposed to an airflow, and where the surrounding air is at least partially untreated ambient air, such that dehydration of the outermost layer of the cut-up food is stopped, and the moisture of each piece of cut-up food tends to be distributed uniformly throughout the entire piece of cut-up food, migrating from the innermost layer towards the partially dehydrated outermost layer, thereby reducing the moisture of said innermost layer. Said process of drying the outer layer by means of an airflow and drying the inner layer by means of migration of the internal moisture towards the outermost layer can be repeated cyclically, alternating air treatment segments with idle segments, until achieving the desired degree of dehydration.

Said predetermined drying will be established, for example, depending on the desired moisture or weight loss of the cut-up food, the weight loss values being able to be, for example, between 22% and 70% with respect to the weight before treatment. Preferably, the purpose to be achieved will be a cut-up food the water activity of which makes pathogenic microorganism growth impossible, which allows conserving the product at room temperature. Said water activity will preferably be less than 0.85.

The conveyor preferably moves the cut-up food at a constant and uniform speed, and the length ratio between an idle segment and the immediately preceding air treatment segment will be between 40% and 60%, thereby achieving air treatment times similar to the idle times.

It will be understood that references to geometric position, such as for example, parallel, perpendicular, tangent, etc. allow deviations of up to ±5° with respect to the theoretical position defined by said nomenclature. Likewise, it will be considered that those features described as parts of the treatment plant are applicable to the method and vice versa.

By means of the proposed drying plant and drying method, which entail an evolution and improvement of the air drying systems known up until today, a quick drying of cured, sliced or cut-up filled food product is achieved based on improving the efficiency of the drying time and on improving the energy consumption necessary to achieve the desired degree of drying.

In one embodiment, the process starts with the manufacturing of sticks of meat product. Next, and depending on the type of dry cut-up food to be obtained, known in the sector as meat snack, different prior treatments such as fermentation, cooking or simply starting the drying process can be performed. If a process has been performed before drying, and the product can be frozen as long as it is necessary for stabilizing same or for improving subsequent cutting. Finally, it can be cut to give it the desired shape and size and drying can be started by means of the drying plant and the drying process described above where, once ended, meat snacks ready for packaging will be obtained.

The invention relates to a continuous automated process which, between prior product treatment, freezing and drying treatment, allows speeding up the generation of new snack formats and products exponentially. Freezing before drying allows providing the process with a great versatility and functionality, not only due to the fact that it allows having stored stock for being transformed into end product when required, but it furthermore allows bringing the product to the limit during the prior phases and stabilizing it thereafter. In the case of fermentation, for example, it is possible to work at extreme relative humidities and temperatures that are unthinkable in conventional methods, since once the desired pH and curing level have been reached, the product freezes, thereby stopping any process or evolution that it may undergo.

The range of temperatures and humidities at which the equipment works has allowed creating different products having a high added value which, due to their physicochemical and organoleptic characteristics, need these drying conditions.

The fact of being able to use different temperatures and humidities in the process itself and the ease of being able to change these temperatures and humidities by means of adjustment and configuration of the drying plant, make the process very versatile with respect to the ability to produce different products, which allows developing and producing new and innovative meat snacks that are stable at room temperature, the texture, taste and aroma of which are customized for each type of consumer.

It is envisaged that the proposed plant and method, according to a possible implementation, are used for obtaining three basic types of meat snacks:
  Dried meat cut into cubes or strips
  Extruded ground meat
  Crispy meat slices In the case of dried meat cut into cubes or strips, it must be pointed out that the current process in the industry is hardly automated and that, although some large producers manufacture said dried meat in an industrial manner today by means of injecting the curing solution in the mass with a subsequent kneading in a drum, the drying process requires placing the meat strips manually in carriages, either in trays or bars. This involves a lot of manpower and preparation of the product in batches that are small enough to be handled manually. The proposed plant and process allow replacing these manual processes with automated processes, obtaining equivalent results at a lower cost.

According to one embodiment, the invention starts from a base of lean meaty material, which has been stabilized, pasteurized and subsequently frozen and to which the desired shape is given in the moment before drying. Different aromas and/or spices can be applied depending on the variety to be packaged, for example, by means of adding spices and/or flavorings or artificial seasonings to said lean meaty material, for example, giving it a spicy flavor, or teriyaki sauce flavor, cheese flavor, etc., and the drying thereof can be performed continuously and automatically.

This new concept allows the possibility of, starting from a single generic raw material and, by subsequently modifying the specifications for cutting, adding additives into, and drying the cut-up food, differentiating the end product by simply adjusting the operating parameters of the installation. This represents a great advantage in logistics and planning as it allows starting from one and the same base and producing the product in demand continuously and automatically. This flexibility allowed by the proposed plant and method is furthermore the basis for any snack line that must adapt to the constant changes of market preferences.

As regards extruded ground meat, it is based on the evolution of the conventional filled food products in stick formats, but with final gauges comprised between 3 and 15 mm and are stable at room temperature.

Generally, filling by means of co-extrusion with an alginate or collagen solution of the initially prepared meat paste is used for the production of these extruded meat snacks. Once filled, fermentation, drying and, finally, weighing and packaging of the finished product are performed, the conventional drying process again being very slow (about three days) and rather ineffective.

Again, the implementation of the proposed drying plant and drying method allow speeding up this process and making it less expensive, like in the case of the cut dried meat products.

Furthermore, the proposed drying plant and method allow not using casing for filling since, by using the accelerated drying process, a dry protein layer is immediately formed around the product aiding to maintain the shape and consistency of the product.

Crispy meat slices consist of meat product cut into thin slices that are dried until achieving a crispy texture without having to fry same.

In the process before drying, the organoleptic characteristics that will confer the desired texture to the final chip are developed. This system allows applying both fermentation and cooking before drying. This prior step is particularly important for texture development in uncooked cured chips, since the prior parboiling with selected *Micrococcus* strain will generate the proteolysis necessary to prevent the chip, once in the mouth and upon rehydrating during chewing, from recovering the gummy texture typical of dried meat. This prior process will be, for example, the one described in patent application EP2912957, belonging to the same inventors, having complementary features and offering synergy with the invention proposed in this document.

The fermented chips are dried until achieving a completely crispy texture using treatment temperatures below the clotting temperature of microfibrillar proteins, thereby preventing any change in the texture of the cured product during chewing, but also the loss of volatile aromas generated during fermentation. To achieve crispiness, slicing is performed such that it has a thickness less than one millimeter and the proposed drying allows obtaining a more conventional appearance, which allows preparing chips from cured ham or "chorizo" (spicy Spanish sausage), chicken, turkey, which can be smoked or not, etc. Like in the production of conventional snacks, flavorings or spices can be added in line and automatically to thereby generate larger number of references starting from the same base.

The crispy meat sliced products will preferably have a moisture less than 6% and a water activity less than 0.4, and will require prompt packaging into an airtight container to prevent them from rehydrating and therefore losing their crispiness.

Other features of the invention will be shown in the following detailed description of an embodiment.

BRIEF DESCRIPTION OF THE DRAWINGS

The foregoing and other advantages and features will be better understood based on the following detailed description of an embodiment in reference to the attached drawings which must be interpreted in an illustrative and non-limiting manner, in which.

DETAILED DESCRIPTION OF AN EMBODIMENT

Figure 1:
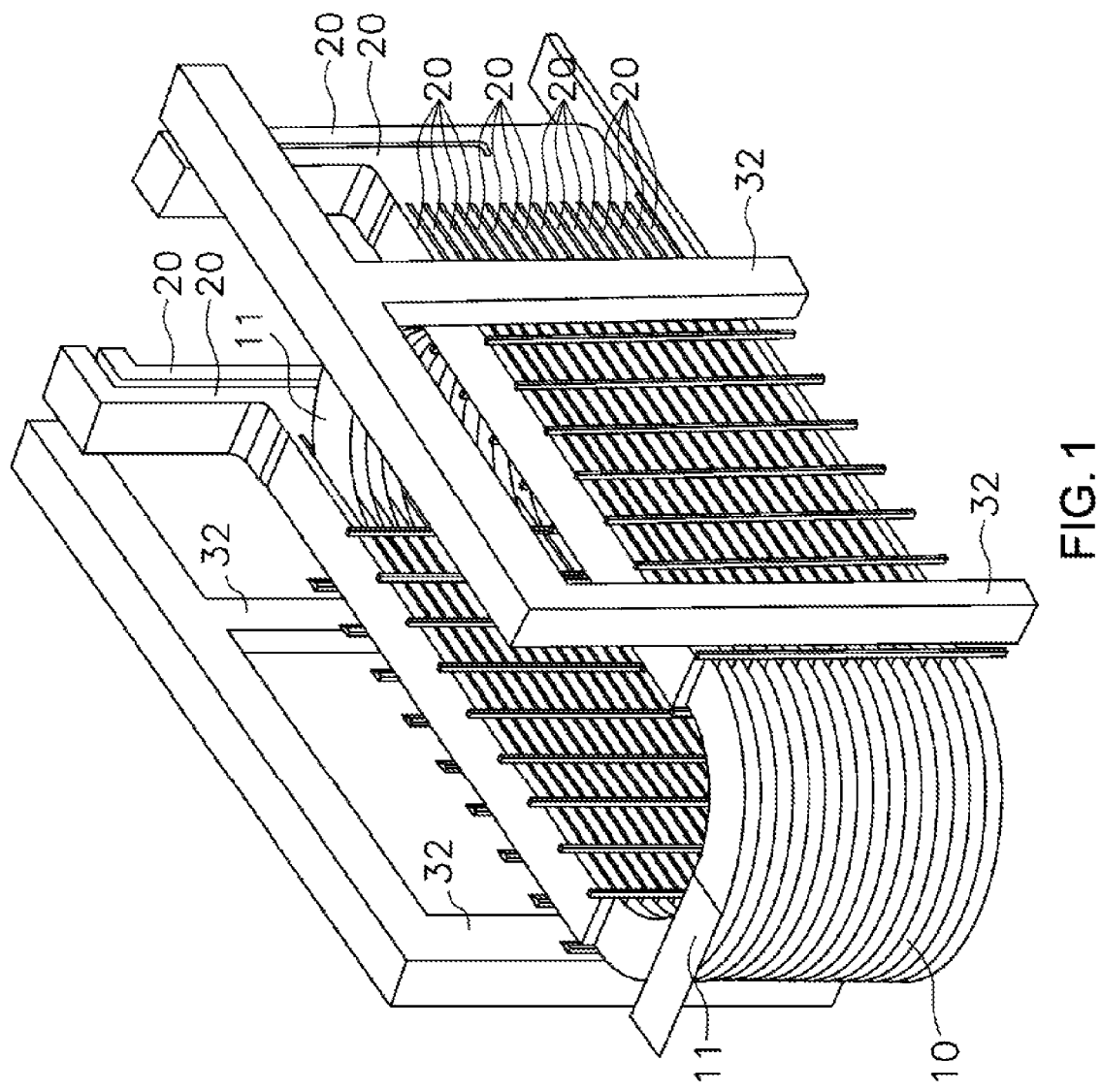
FIG. 1 shows a schematic perspective view of a drying plant for drying cut-up food provided with a spiral conveyor with sixteen superimposed levels each provided with two straight segments and two end curved segments, and including blowing conduits intercalated between the straight segments of said superimposed levels and suction conduits arranged adjacent to said conveyor.
Figure 2:
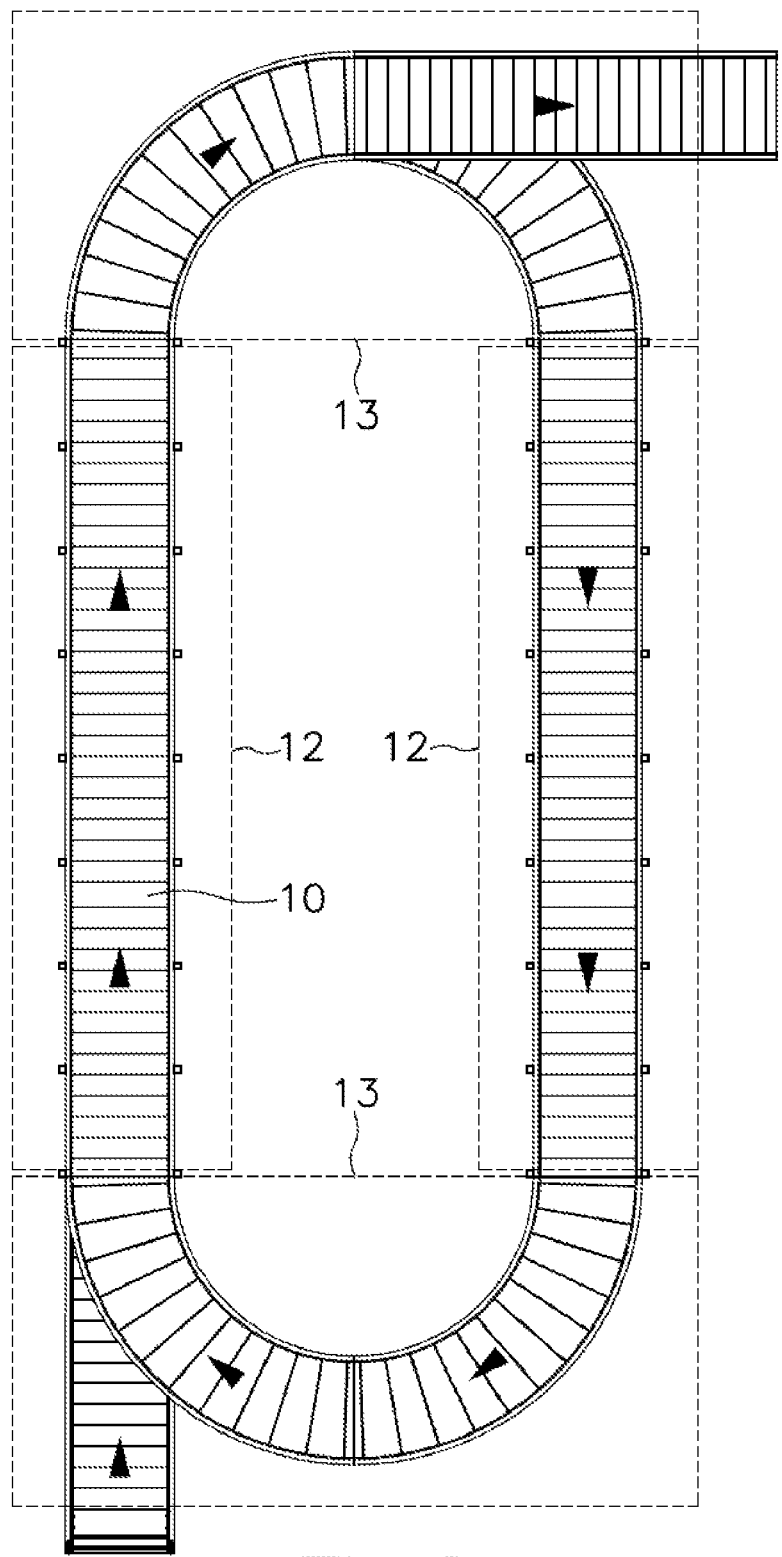
FIG. 2 shows a schematic plan view of the conveyor shown in FIG. 1, devoid of the blowing and suction conduits.

According to a non-limiting, illustrative embodiment of the present invention, FIG. 1 shows a drying plant for drying cut-up food 1 consisting of a conveyor 10 in the form of a spiral conveyor with superimposed levels, each level integrated by a first straight segment, connected at one end to a first curved segment, attached in continuity to a second straight segment, and connected in turn to a second curved segment.

Each of said segments is slightly inclined, such that upon completing a complete turn, the final end of the conveyor 10 of one level is above the initial end of said level, and coinciding with the initial end of the next level, in the direction of conveyance. By connecting a plurality of levels at their initial and final ends, said spiral conveyor 10 with superimposed levels having a notable length and taking up a small volume is obtained.

Optionally, a plurality of spiral conveyors 10 with superimposed levels can be connected such that the cut-up food 1 goes through said plurality of spiral conveyors 10 before completing treatment.

The mentioned conveyor 10 can consist of conveyor belts defining a conveying surface, or sliding or tray driving mechanisms, which define said conveying surfaces on which the cut-up food 1 fed to the described air drying plant is deposited.

Figure 3:
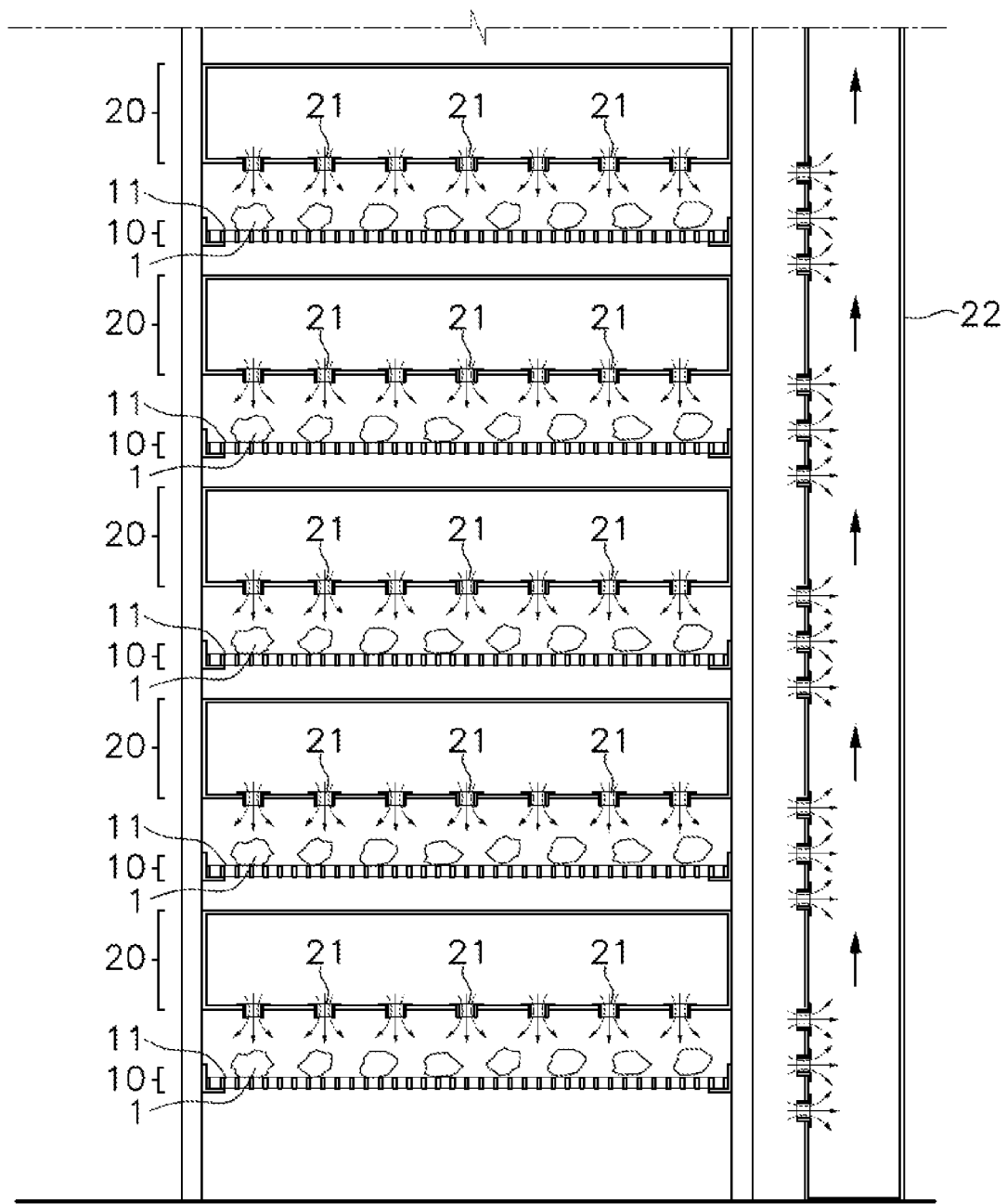
FIG. 3 shows an enlarged cross-section of a plurality of superimposed levels of the conveyor, corresponding to a section of the corresponding air treatment segments, where blowing conduits interposed between the levels of the conveyor provide a treated airflow in a downward direction on each of the air treatment segments through blowing openings provided in said blowing conduits.

The aforementioned straight segments of the conveyor 10 have an approximate length of between 8 and 12 meters, and have respective conveying surfaces 11 facing blowing openings 21 provided in blowing conduits 20 intercalated between the superimposed levels of the conveyor 10, such that said straight segments define air treatment segments 12 for treatment of the cut-up food 1, as it is exposed to an upward or downward flow of treated air driven through said blowing openings 21. In the present embodiment, the blowing conduits 20 intercalated between the straight segments of the conveyor 10 are straight conduits extending in a direction parallel to the direction of conveyance of the conveyor 10, as can be seen in FIG. 3.

The blowing conduits 20 are connected to air treatment devices, not shown in FIG. 1, such as for example, heating machines, coolers, heat exchangers, dehumidifiers, etc, which allow providing and driving through said blowing conduits 20 a controlled flow of treated air the temperature and humidity of which are controlled, the controlled temperature being comprised between 4° C. and 60° C. and a controlled humidity, although the temperature will preferably be between 30° and 50° C. and the humidity less than 30%, for example comprised between 5% and 25%.

In the embodiment shown, four initial blowing conduits 20 not intercalated between levels of the conveyor are each divided into eight blowing conduits 20 intercalated between superimposed levels of the conveyor 10, providing a total of thirty-two air treatment segments 12, each facing a blowing conduit 20, corresponding to sixteen superimposed levels.

Figure 4:
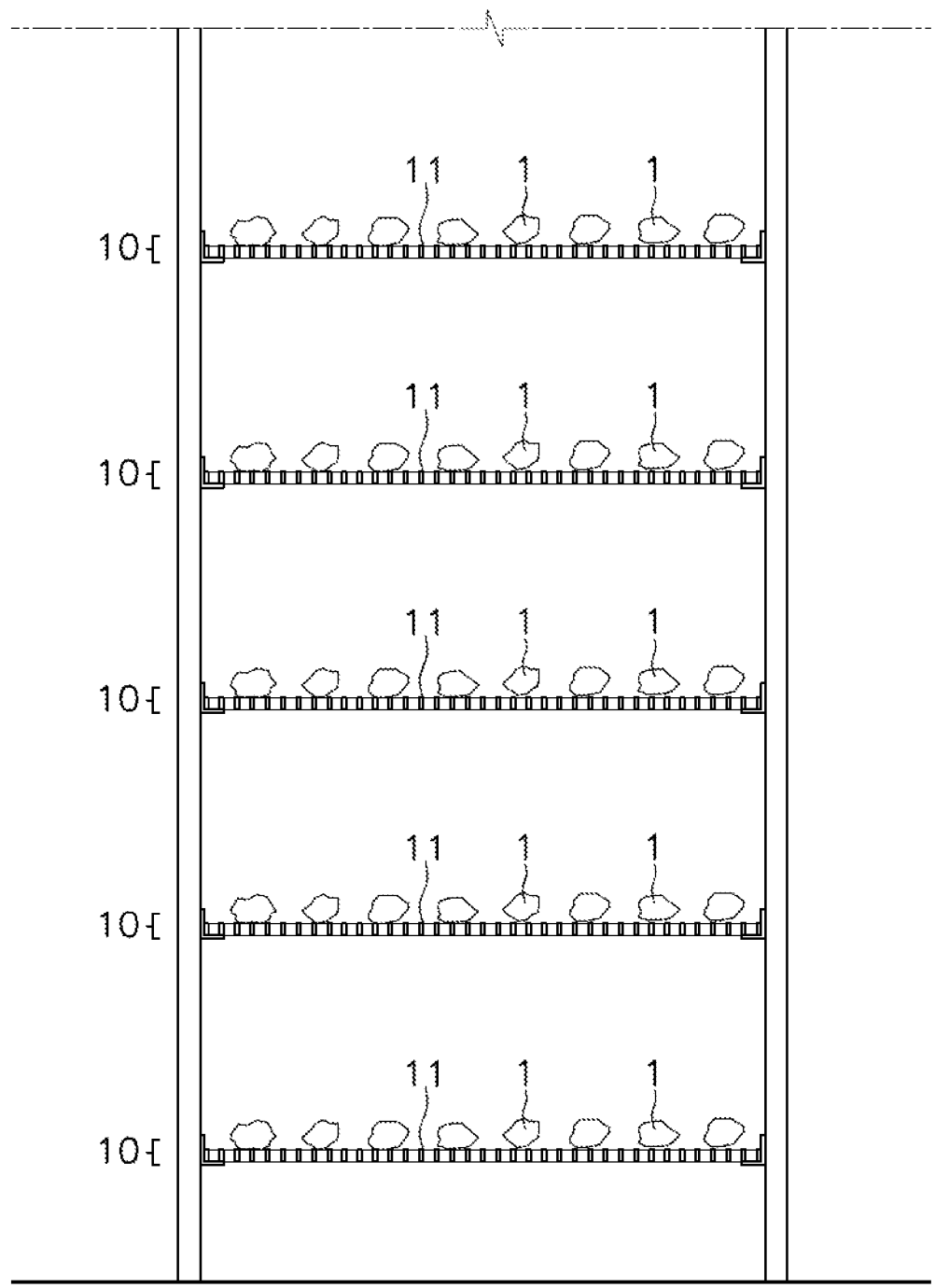
FIG. 4 shows an enlarged cross-section of a plurality of superimposed levels of the conveyor, corresponding to a section of the corresponding idle segments, where the cut-up food is not subjected to any treated or untreated airflow, allowing rehydration of the outermost layer of the cut-up food by means of migration of the internal moisture of said cut-up food.

In contrast, the conveying surface 11 of the aforementioned curved segments of the conveyor will likewise have an approximate length of between 8 and 12 meters measured along their axis; it is not facing the blowing openings 21, so the conveyed cut-up food 1 is not subjected to a treated airflow in said segments, the air surrounding said curved segments being air with a humidity greater than the humidity of the treated air, and preferably having a temperature different from the temperature of the treated air, said curved segments defining idle segments 13 of the cut-up food 1, shown in a cross-section view in FIG. 4.

For example, if the temperature of the treated air is comprised between 30° C. and 60° C., and the temperature of the cut-up food is lower than the mentioned 30° C., the temperature of the air surrounding the idle segments will be lower than the temperature of the treated air. Likewise, if the temperature of the treated air is, for example, comprised between 4° C. and 15° C., and the temperature of the cut-up food is higher than the temperature of the treated air by 5° C., for example, then the temperature of the surrounding air will be higher than the temperature of the treated air.

Therefore, said conveyor 10 alternates air treatment segments 12 with idle segments 13, corresponding respectively to straight and curved segments of the conveyor.

This construction which has been described is simple as it does not require curved, more complex blowing conduits which are arranged facing the curved segments of the conveyor.

In the air treatment segments 12, the treated airflow strikes the conveyed cut-up food 1 deposited on the conveying surface 11 uniformly, such that said treated airflow dries the outermost layer of said cut-up food 1, stripping off and entraining its surface moisture by means of said airflow. Once said outermost layer reaches a certain degree of drying, it prevents the treated airflow from being able to cause the correct drying of the innermost layer of the cut-up food 1, since the already dry outermost layer cannot continue to be dried more, and its thickness prevents the treated airflow from causing the drying of the innermost layer of the cut-up food 1.

To prevent this phenomenon, it is proposed to arrange idle segments 13 intercalated between the air treatment segments 12. In said idle segments 13, there is no treated airflow striking the cut-up food 1, and therefore no additional drying of the outermost layer in said idle segments 13. In contrast, the moisture contained in the cut-up food 1 tends to be distributed homogeneously, so in the idle segments 13 said moisture has time to migrate from the innermost layer towards the previously dried outermost layer, thereby causing the drying of the innermost layer reducing its moisture content and rehydrating the outermost layer from the inside.

After that step, the cut-up food 1 is again carried to an air treatment segment 12 where the treated airflow again dries the outermost layer of the cut-up food 1.

This method can be repeated as many times as necessary until achieving an optimum degree of drying of the cut-up food 1 as a whole.

Along with the air treatment segments 12 there are arranged suction conduits 22 suctioning the surrounding air which, for the most part, will be previously treated air driven through the blowing openings 21, and which will have absorbed part of the moisture of the treated food 1.

Preferably, said suction conduits 22 will be connected to the air treatment devices providing the treated air, such that part or all of the air suctioned through the suction conduits 22 can be reused as treated air, and/or part of the energy contained in said suctioned air can be recovered, for example, by means of heat exchangers.

Similarly, a method is proposed which consists of alternating the treatment of the cut-up food 1 by means of a treated airflow applied in air treatment segments 12 of a conveyor 10, and by means of conveying the cut-up food 1 in idle segments 13 where there is no airflow, these steps being repeated cyclically until achieving the desired degree of drying of the cut-up food. The speed of conveyance of the cut-up food will preferably be constant.

The invention claimed is:

1. An air-drying plant for air drying cut-up food, including
   a conveyor (10) for cut-up food (1) defining a conveying surface (11) and a conveyance direction
   a plurality of blowing conduits (20) including blowing openings (21) channeling a treated airflow with a temperature comprised between 4° C. and 60° C. and a controlled humidity;
   characterized in that:
   the conveyor includes air treatment segments (12) the conveying surfaces (11) of which are facing and adjacent to said blowing openings (21) of at least one of said plurality of blowing conduits (20), said treated airflow being directed against said conveying surface (11) of the air treatment segments (12) at a speed of treatment, directly affecting the cut-up food (1) in a downward direction or in a upward direction through the conveyor, the conveyor being perforated;
   the conveyor (10) also includes idle segments (13) intercalated between said air treatment segments (12), the conveying surface (11) of which is not facing the blowing openings (21), nor is it subjected to an airflow directed against said conveying surface (11), and said drying plant comprising a plurality of said idle segments (13) intercalated between a plurality of air treatment segments (12) along the conveyance direction.

2. The drying plant according to claim 1, wherein the characteristics of a treated air of said treated airflow are selected from:
a relative humidity less than 35% or comprised between 5% and 25%;
a temperature comprised between 30° and 50°;
the speed of treatment of the treated air directed against said conveying surface (11) is greater than 1 m/s or greater than 1.5 m/s.

3. The drying plant according to claim 1, wherein the characteristics of an air surrounding the idle segments (13) are selected from:
a relative humidity greater than the relative humidity of a treated air of the treated airflow;
a temperature lower than the temperature of a treated air of the treated airflow, the temperature of the treated air being higher than the temperature of the cut-up food fed included in the drying plant, or a temperature higher than the temperature of the treated air, the temperature of the treated air being lower than the temperature of the cut-up food included in the drying plant.

4. The drying plant according to claim 1 wherein the conveyor (10) is selected from:
a conveyor with superimposed levels;
a perforated conveyor with superimposed levels;
a spiral conveyor with superimposed levels;
a perforated spiral conveyor with superimposed levels.

5. The drying plant according to claim 4, wherein said plurality of blowing conduits (20) are arranged intercalated between said superimposed levels of the conveyor (10) or of the spiral conveyor.

6. The drying plant according to claim 5, wherein said conveyor includes straight segments of the conveyor arranged in superimposed levels, and wherein said blowing conduits (20) include straight blowing conduits superimposed to said straight segments of the conveyor, said straight segments of the conveyor forming the air treatment segments (12).

7. The drying plant according to claim 6, wherein said conveyor (10) includes superimposed curved conveyor segments, and wherein said curved conveyor segments lack blowing conduits (20) provided with blowing openings (21) intercalated between said superimposed curved conveyor segments, said curved conveyor segments forming the idle segments (13).

8. The drying plant according to claim 1, wherein a face provided with blowing openings (21) of at least one blowing conduit (20) of said plurality of blowing conduits (20) is parallel to the conveying surface (11) of the segment of the conveyor facing said surface, said at least one blowing conduit (20) being elongated in a direction parallel to the direction of conveyance of the segment of the conveyor (10) facing said conduit.

9. The drying plant according to claim 1, wherein at least one segment (10) of a blowing conduit (20) of said plurality of blowing conduits (20) has a constant width and a variable section decreasing in an air circulation direction through an inside thereof.

10. The drying plant according to claim 1 wherein the features of the conveyor are selected from the following:

each of said air treatment segments (12) has a length, in the conveyance direction, greater than five meters;
each of said idle segments (13) has a length, in the conveyance direction, greater than five meters;
the length of at least one idle segment (13) is comprised between 40% and 60% of the length of the air treatment segments (12) preceding, in the conveyance direction, said at least one idle segment (13).

11. The drying plant according to claim 1, wherein suction conduits (22) are arranged adjacent to the air treatment segments (12), an air absorbed by said suction conduits (22) being used for obtaining a treated air of the treated airflow.

12. The drying plant according to claim 11, wherein at least part of said suction conduits (22) are located in limits between the air treatment segments (12) and the idle segments (13).

13. An air-drying method for air drying cut-up food, said method being applied by means of a plant including:
a conveyor (10) for cut-up food (1) defining a conveying surface (11) and a conveyance;
a plurality of blowing conduits (20) including blowing openings (21) channeling a treated airflow with a temperature comprised between 4° C. and 60° C. and a controlled humidity;
the method being characterized in that it comprises the following steps:
a) feeding cut-up food (1) to said conveying surface (11) of the conveyor (10);
b) conveying, by an operation of the mentioned conveyor (10), said cut-up food (1) to an air treatment segment (12) facing said blowing openings (21), said cut-up food (1) being arranged facing said blowing openings (21) of said blowing conduits (20);
c) subjecting said cut-up food (1) to a drying treatment by said treated airflow directed against said conveying surface (11) of the air treatment segments (12) at a speed of treatment, directly affecting the cut-up food (1) for a drying time, causing moisture reduction in an outermost layer of said cut-up food (1);
d) conveying, by an operation of the mentioned conveyor (10), said cut-up food (1) to an idle segment of the conveyor (10), said cut-up food (1) being exposed to a surrounding air lacking an airflow directed against said conveying surface for an idle time, causing rehydration of the outermost layer of the cut-up food with an internal moisture of the cut-up food, tending to achieve a homogeneous moisture in the cut-up food as a whole;
e) repeating steps b), c) and d) cyclically, along a succession of a plurality of air treatment segments (12) and idle segments (13) that are intercalated, until achieving specific drying of the cut-up food (1).

14. The method according to claim 13, wherein the conveyor moves the cut-up food (1) at a constant and uniform speed.

15. The method according to claim 13, wherein a ratio between drying time and idle time is between 40% and 60%.

16. The method according to claim 14, wherein a ratio between drying time and idle time is between 40% and 60%.

* * * * *